United States Patent
Nagarajan et al.

(10) Patent No.: US 12,114,312 B2
(45) Date of Patent: Oct. 8, 2024

(54) PHYSICAL UPLINK CONTROL CHANNEL CONFIGURATION FOR MILLIMETER WAVE BANDS

(71) Applicant: QUALCOMM Incorporated, San Diego, CA (US)

(72) Inventors: Anantha Krishna Karthik Nagarajan, San Diego, CA (US); Jing Sun, San Diego, CA (US); Jun Ma, San Diego, CA (US); Xiaoxia Zhang, San Diego, CA (US); Zhifei Fan, San Diego, CA (US); Wooseok Nam, San Diego, CA (US); Qiang Wu, San Diego, CA (US); Tao Luo, San Diego, CA (US); Peter Gaal, San Diego, CA (US); Juan Montojo, San Diego, CA (US); Ahmed Abdelaziz Ibrahim Abdelaziz Zewail, San Diego, CA (US); Mehmet Izzet Gurelli, San Diego, CA (US); Iyab Issam Sakhnini, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 736 days.

(21) Appl. No.: 17/248,444

(22) Filed: Jan. 25, 2021

(65) Prior Publication Data
US 2022/0240243 A1    Jul. 28, 2022

(51) Int. Cl.
*H04W 72/21*    (2023.01)
*H04L 27/26*    (2006.01)
(Continued)

(52) U.S. Cl.
CPC ......... *H04W 72/21* (2023.01); *H04L 27/2607* (2013.01); *H04W 72/51* (2023.01); *H04W 72/0453* (2013.01)

(58) Field of Classification Search
None
See application file for complete search history.

(56) References Cited

U.S. PATENT DOCUMENTS

2015/0264551 A1* 9/2015 Ko .................. H04L 5/0082
370/329
2016/0211959 A1* 7/2016 Jöngren ............. H04W 24/08
(Continued)

FOREIGN PATENT DOCUMENTS

EP          3667971 A1    6/2020
WO    WO-2020028868 A1    2/2020
(Continued)

OTHER PUBLICATIONS

International Search Report and Written Opinion—PCT/US2022/070316—ISA/EPO—May 6, 2022.

*Primary Examiner* — Hassan A Phillips
*Assistant Examiner* — Gautam Sharma
(74) *Attorney, Agent, or Firm* — Harrity & Harrity, LLP

(57) ABSTRACT

Various aspects of the present disclosure generally relate to wireless communication. In some aspects, a user equipment (UE) may process, for a physical uplink control channel (PUCCH) communication in a millimeter wave (mmWave) band, information for transmission, wherein the information is modulated using an extended sequence with a length greater than a base sequence length for PUCCH communication or wherein a cyclic shift, of a plurality of cyclic shifts for a set of contiguous resource blocks for transmission of the information, is applied to the information based at least in part on a resource block group associated with the information. The UE may transmit the information based at least in part on processing the information. Numerous other aspects are described.

30 Claims, 9 Drawing Sheets

(51) Int. Cl.
*H04W 72/51* (2023.01)
*H04W 72/0453* (2023.01)

(56) References Cited

U.S. PATENT DOCUMENTS

| | | | | |
|---|---|---|---|---|
| 2018/0006791 A1* | 1/2018 | Marinier | ............... | H04L 1/0057 |
| 2019/0007175 A1* | 1/2019 | Kwak | ................... | H04L 5/0053 |
| 2019/0103953 A1* | 4/2019 | Liao | ...................... | H04L 5/0042 |
| 2020/0052802 A1* | 2/2020 | Ryu | ...................... | H04W 24/08 |
| 2020/0120701 A1* | 4/2020 | Peng | ..................... | H04W 72/23 |
| 2020/0314881 A1* | 10/2020 | Bagheri | ............... | H04L 5/0051 |
| 2022/0240243 A1* | 7/2022 | Nagarajan | ............. | H04L 1/1864 |
| 2023/0055366 A1* | 2/2023 | Lunttila | ................ | H04W 72/21 |
| 2023/0083499 A1* | 3/2023 | Shin | ..................... | H04W 72/21 |
| | | | | 370/329 |
| 2023/0156678 A1* | 5/2023 | Nakano | ................. | H04W 72/53 |
| | | | | 370/329 |

FOREIGN PATENT DOCUMENTS

| | | | |
|---|---|---|---|
| WO | WO-2020146643 A1 | 7/2020 | |
| WO | WO-2020154383 A1 | 7/2020 | |

\* cited by examiner

PHYSICAL UPLINK CONTROL CHANNEL CONFIGURATION FOR MILLIMETER WAVE BANDS

FIELD OF THE DISCLOSURE

Aspects of the present disclosure generally relate to wireless communication and to techniques and apparatuses for physical uplink control channel configuration for millimeter wave bands.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors operatively coupled to the memory, the memory and the one or more processors configured to: process, for a physical uplink control channel (PUCCH) communication in a millimeter wave (mmWave) band, information for transmission, wherein the information is modulated using an extended sequence with a length greater than a base sequence length for PUCCH communication or wherein a cyclic shift, of a plurality of cyclic shifts for a set of contiguous resource blocks for transmission of the information, is applied to the information based at least in part on a resource block group associated with the information; and transmit the information based at least in part on processing the information.

In some aspects, a method of wireless communication performed by a UE includes processing, for a PUCCH communication in an mmWave band, information for transmission, wherein the information is modulated using an extended sequence with a length greater than a base sequence length for PUCCH communication or wherein a cyclic shift, of a plurality of cyclic shifts for a set of contiguous resource blocks for transmission of the information, is applied to the information based at least in part on a resource block group associated with the information; and transmitting the information based at least in part on processing the information.

In some aspects, a non-transitory computer-readable medium storing a set of instructions for wireless communication includes one or more instructions that, when executed by one or more processors of a UE, cause the UE to: process, for a PUCCH communication in a mmWave band, information for transmission, wherein the information is modulated using an extended sequence with a length greater than a base sequence length for PUCCH communication or wherein a cyclic shift, of a plurality of cyclic shifts for a set of contiguous resource blocks for transmission of the information, is applied to the information based at least in part on a resource block group associated with the information; and transmit the information based at least in part on processing the information.

In some aspects, an apparatus for wireless communication includes means for processing, for a PUCCH communication in a mmWave band, information for transmission, wherein the information is modulated using an extended sequence with a length greater than a base sequence length for PUCCH communication or wherein a cyclic shift, of a plurality of cyclic shifts for a set of contiguous resource blocks for transmission of the information, is applied to the information based at least in part on a resource block group associated with the information; and means for transmitting the information based at least in part on processing the information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
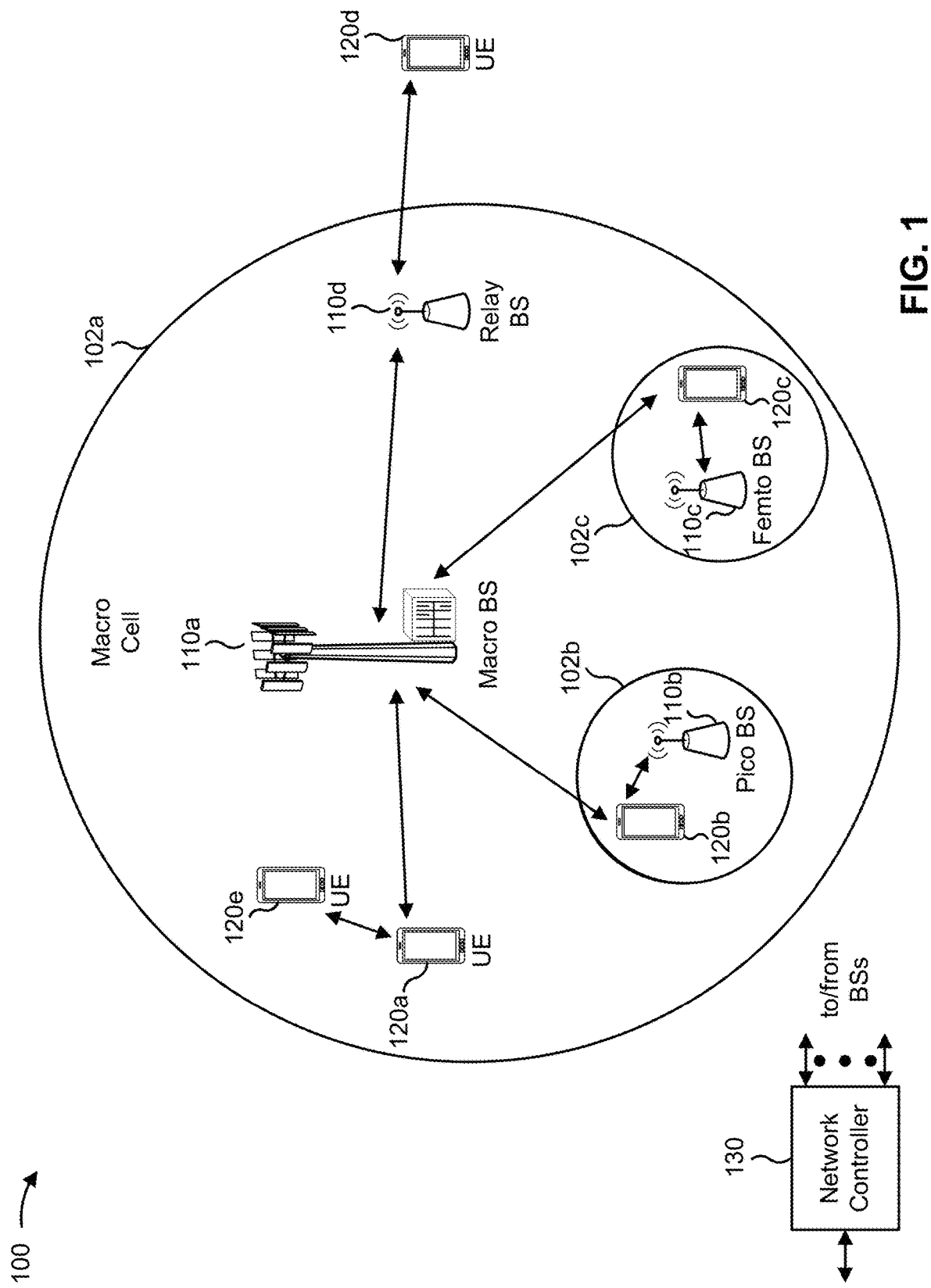
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
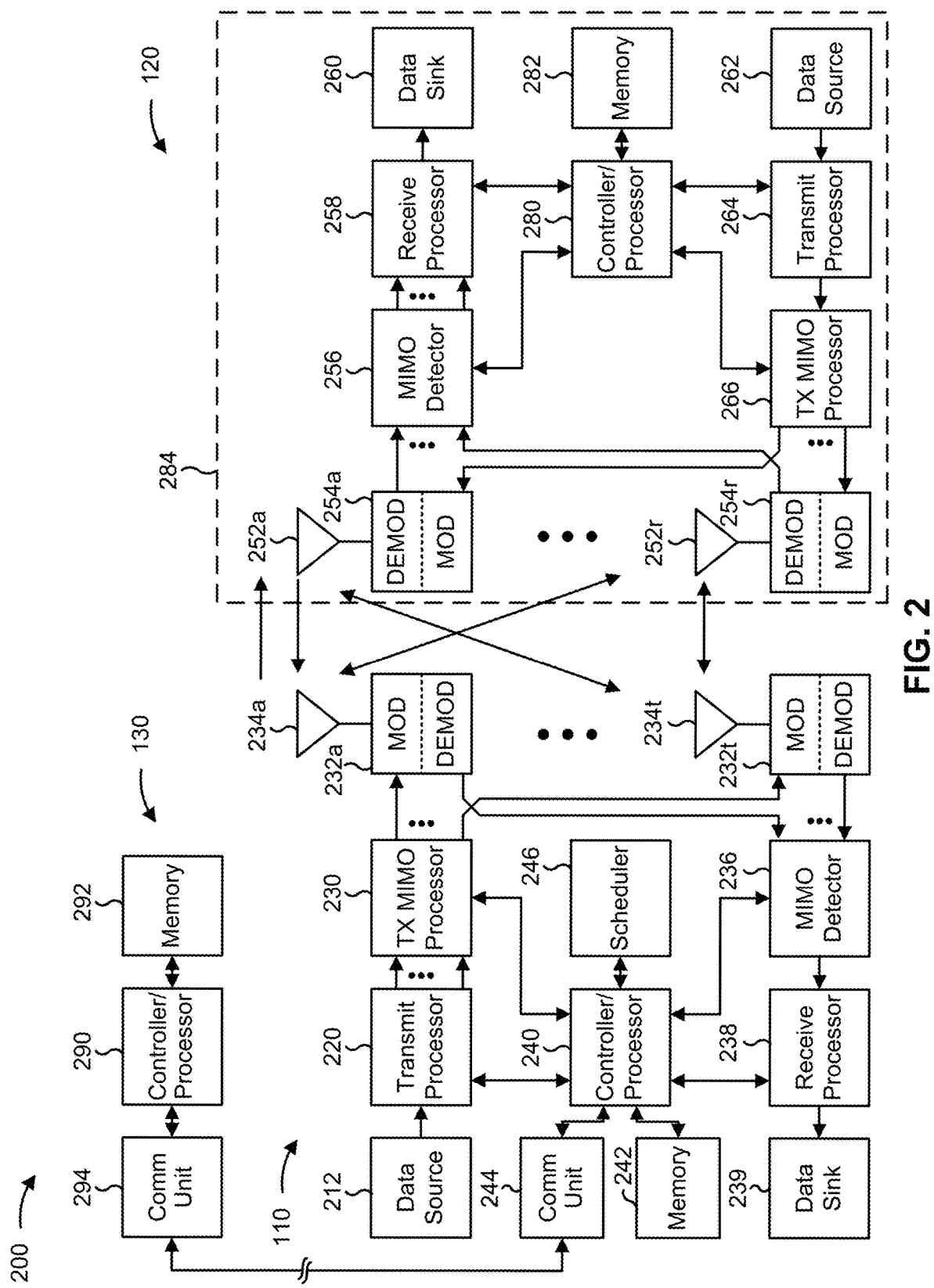
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-7.

Controller/processor 240 of base station 110, controller/processor 280 of UE 120, and/or any other component(s) of FIG. 2 may perform one or more techniques associated with physical uplink control channel (PUCCH) configuration for millimeter wave (mmWave) bands, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, the UE includes means for processing, for a PUCCH communication in an mmWave band, information for transmission or means for transmitting the information based at least in part on processing the information. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for applying the cyclic shift to the information, wherein the cyclic shift is selected from a set of cyclic shifts that are based at least in part on the length of the extended sequence.

In some aspects, the UE includes means for transmitting a first indicator identifying a UE capability of the UE; means for receiving a second indicator identifying a quantity of contiguous resource blocks for transmission of the information; or means for processing the information based at least in part on the quantity of contiguous resource blocks for transmission of the information.

In some aspects, the UE includes means for identifying a stored default value for a quantity of contiguous resource blocks for transmission of the information; or means for processing the information based at least in part on the quantity of contiguous resource blocks for transmission of the information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
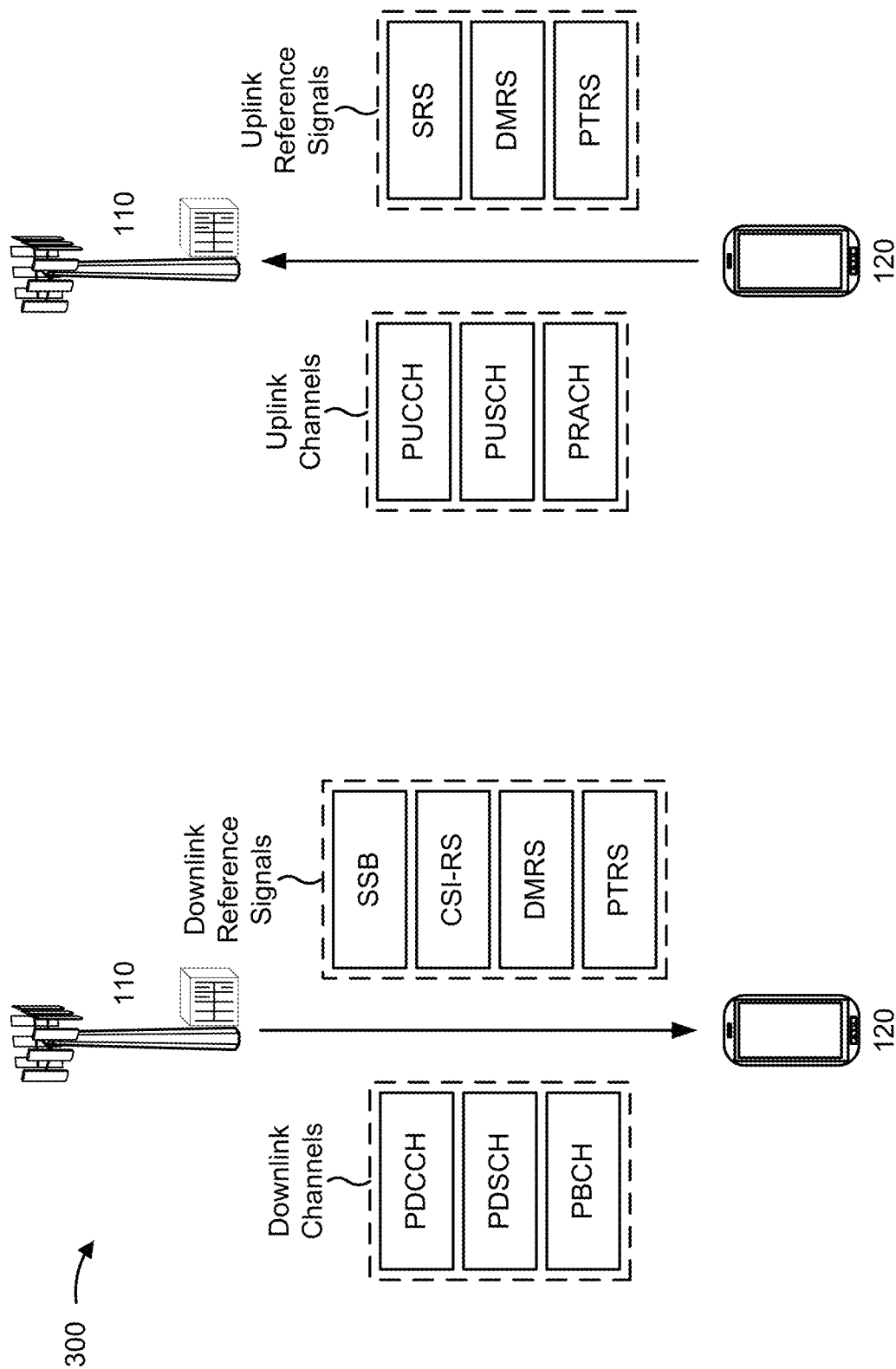
FIG. 3 is a diagram illustrating an example of physical channels and reference signals in a wireless network, in accordance with various aspects of the present disclosure.

FIG. 3 is a diagram illustrating an example 300 of physical channels and reference signals in a wireless network, in accordance with various aspects of the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a PUCCH that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
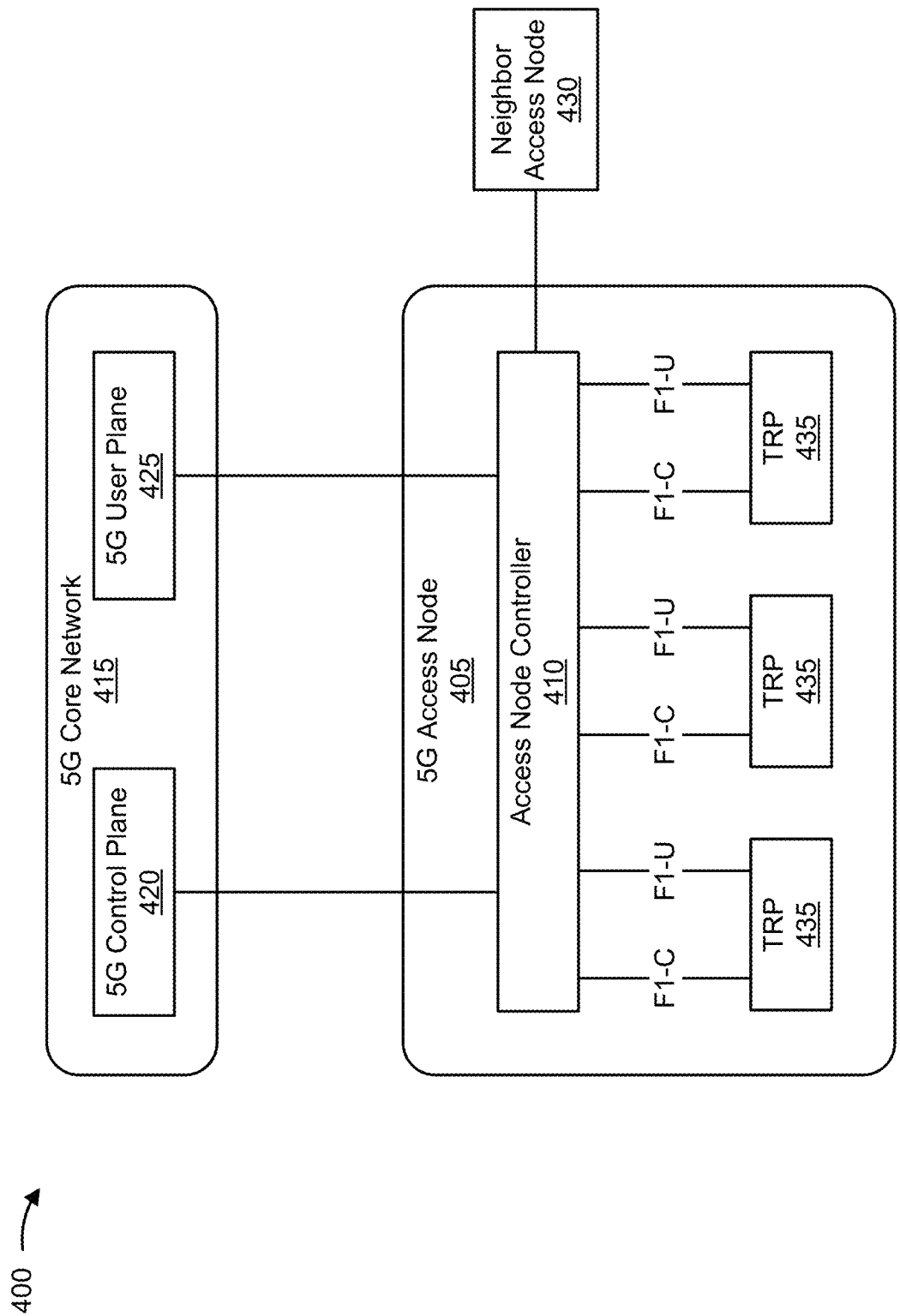
FIG. 4 is a diagram illustrating an example of a distributed radio access network (RAN), in accordance with various aspects of the present disclosure.

FIG. 4 illustrates an example logical architecture of a distributed RAN 400, according to aspects of the present disclosure.

A 5G access node 405 may include an access node controller 410. The access node controller 410 may be a central unit (CU) of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may be a distributed unit (DU) of the distributed RAN 400. In some aspects, a TRP 435 may correspond to a base station 110 described above in connection with FIG. 1. For example, different TRPs 435 may be included in different base stations 110. Additionally, or alternatively, multiple TRPs 435 may be included in a single base station 110. In some aspects, a base station 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400. For example, a packet data convergence protocol (PDCP) layer, a radio link control (RLC) layer, and/or a medium access control (MAC) layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi-co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
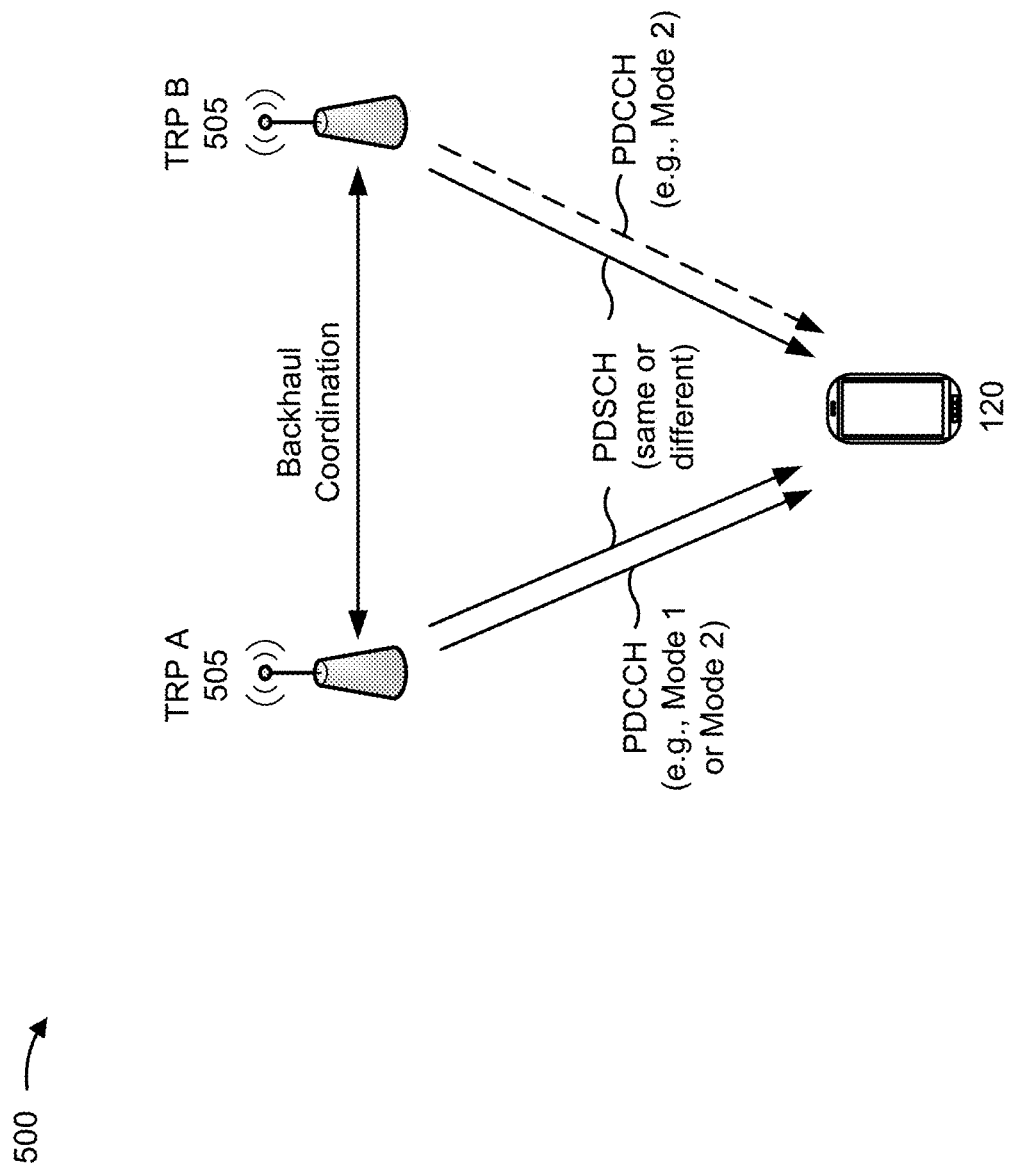
FIG. 5 is a diagram illustrating an example of multi-transmit receive point (TRP) communication, in accordance with various aspects of the present disclosure.

FIG. 5 is a diagram illustrating an example 500 of multi-TRP communication (sometimes referred to as multi-panel communication), in accordance with various aspects of the present disclosure. As shown in FIG. 5, multiple TRPs 505 may communicate with the same UE 120. A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller 410). The interface may have a smaller delay and/or higher capacity when the TRPs 505 are co-located at the same base station 110 (e.g., when the TRPs 505 are different antenna arrays or panels of the same base station 110), and may have a larger delay and/or lower capacity (as compared to co-location) when the TRPs 505 are located at different base stations 110. The different TRPs 505 may communicate with the UE 120 using different QCL relationships (e.g., different TCI states), different DMRS ports, and/or different layers (e.g., of a multi-layer communication).

In a first multi-TRP transmission mode (e.g., Mode 1), a single PDCCH may be used to schedule downlink data communications for a single PDSCH. In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 5 is provided as an example. Other examples may differ from what is described with respect to FIG. 5.

In some communications systems, such as in NR unlicensed spectrum in higher frequency bands (e.g., mmWave bands, such as approximately 60 gigahertz (GHz)), a power spectral density (PSD) limit is applicable to transmissions. For example, a transmitter may limit a transmission to 23 decibel-milliwatts (dBm) per megahertz (MHz) with up to a maximum of 40 dBm effective isotropic radiated power (EIRP). To fully utilize available power for a high-EIRP-capable device, the high-EIRP-capable device may occupy at least a 50 MHz transmission bandwidth, which may enable the high-EIRP-capable device to achieve up to 40 dBm under the 23 dBm/MHz PSD limitation.

During transmission of a PUCCH, a transmitter may occupy a particular amount of available bandwidth. For example, for a 120 kilohertz (kHz) subcarrier spacing (SCS) for a PUCCH format 0, 1, or 4, the transmitter may occupy 1 resource block (RB) in a frequency domain, which may result in a total occupied bandwidth of 1.44 MHz. In contrast, for a 120 kHz SCS with a PUCCH format 2 or 3, the transmitter may occupy up to 16 RBs in the frequency domain, which may result in a total occupied bandwidth of approximately 23 MHz. Similarly, for a 960 kHz SCS, with a PUCCH format 0, 1, or 4, a total occupied bandwidth may be approximately 12 MHz. Accordingly, a total occupied bandwidth may be insufficient to make full use of available transmission power, which may result in reduced communication performance relative to using all available transmission power.

Some aspects described herein enable PUCCH configuration for mmWave bands. For example, a UE may process a PUCCH format 0 or 1 communication to use a set of M contiguous RBs when operating in a higher frequency band, such as an mmWave band. Additionally, or alternatively, the UE may use different cyclic shifts for different RB groups in the set of M contiguous RBs. Similarly, the UE may process a PUCCH format 2 communication to use more than a threshold RBs (e.g., up to 34 RBs, rather than a maximum of 16 RBs). Similarly, the UE may process a PUCCH format 3 communication to apply block-wise pre-discrete Fourier transform (DFT) (pre-DFT) orthogonal cover code (OCC) to a set of M contiguous RBs. In this way, the UE may increase a total occupied bandwidth, thereby enabling use of a full amount of available transmission power. Based at least in part on enabling use of the full amount of available transmission power, the UE may improve communication performance.

Figure 6:
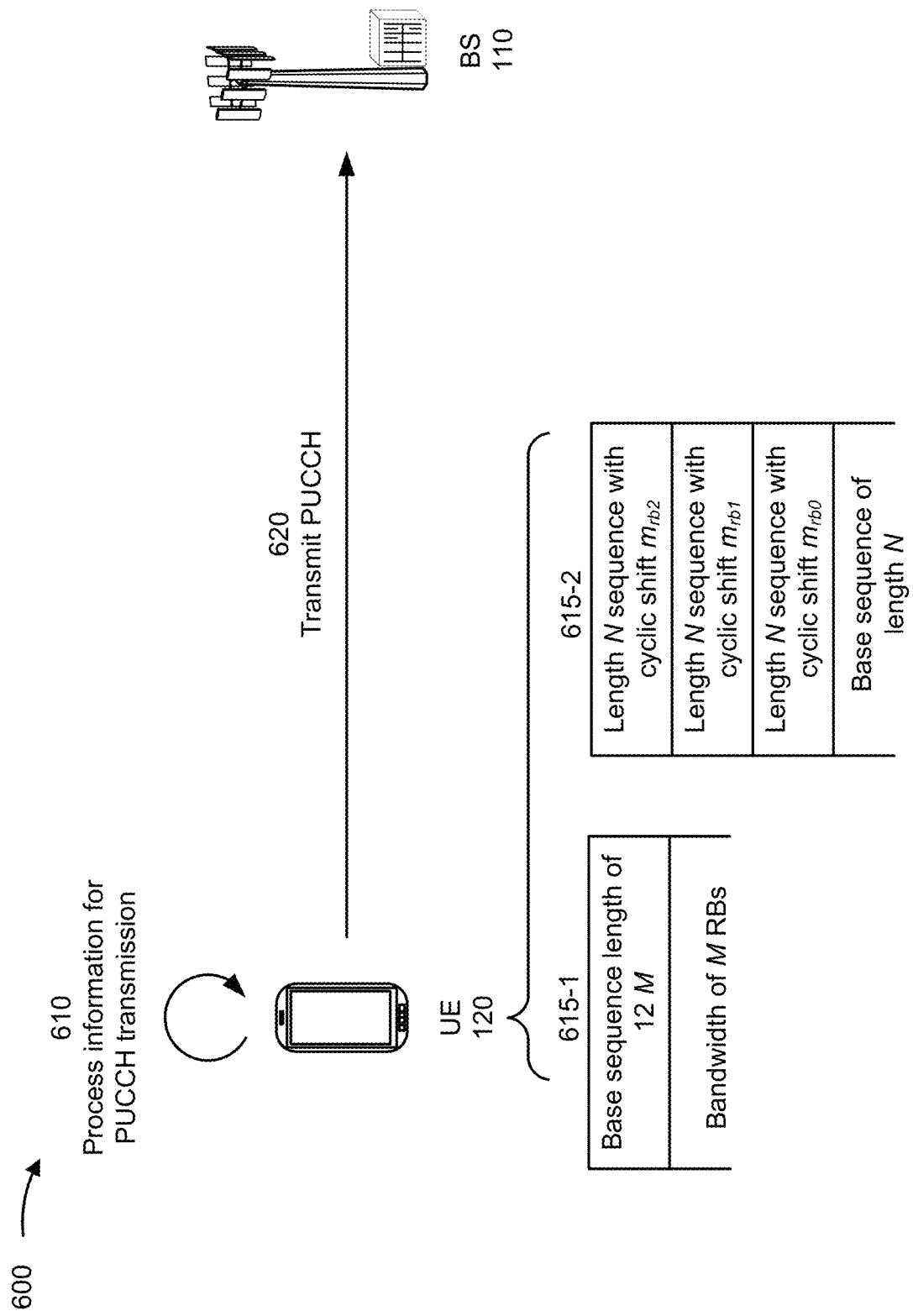
FIG. 6 is a diagram illustrating an example associated with physical uplink control channel configuration for millimeter wave bands, in accordance with various aspects of the present disclosure.

FIG. 6 is a diagram illustrating an example 600 associated with PUCCH configuration for mmWave bands, in accordance with various aspects of the present disclosure. As shown in FIG. 6, example 600 includes communication between a BS 110 and a UE 120. In some aspects, BS 110 and UE 120 may be included in a wireless network, such as wireless network 100. BS 110 and UE 120 may communicate via a wireless access link, which may include an uplink and a downlink.

As further shown in FIG. 6, and by reference number 610, UE 120 may process information for PUCCH transmission. For example, UE 120 may generate a PUCCH communication to convey data via PUCCH resources. In some aspects, the PUCCH communication may be a particular type of PUCCH communication. For example, the PUCCH communication may be a PUCCH format 0 communication, a PUCCH format 1 communication, a PUCCH format 2 communication, or a PUCCH format 3 communication, among other examples.

In some aspects, UE 120 may process the information to use a set of M contiguous RBs for PUCCH transmission. For example, when transmitting a PUCCH format 0 or format 1 communication in an mmWave band, UE 120 may process the information to use a set of M contiguous RBs for PUCCH communication. In this case, UE 120 may use a base sequence of length 12*M to process the information for transmission using the set of M contiguous RBs, as shown by reference number 615-1. In some aspects, UE 120 may use an increased cyclic shift for processing the information. For example, UE 120 may select from an increased quantity of cyclic shifts to apply to the information relative to when the PUCCH communication is transmitted using a bandwidth of only a single RB, as described above.

As an example, for PUCCH communications of PUCCH format 0 described above, UEs may use cyclic shifts of 0, 3, 6, or 9 for hybrid automatic repeat request (HARQ) ACK or NACK feedback. Further, the UEs may use a cyclic shift of 1, 4, 7, or 10 for indicating a positive scheduling request (SR) when SRs are multiplexed into the PUCCH resources. In PUCCH communication with a set of M contiguous RBs, UE 120 may further use additional values for the cyclic shift. Additionally, or alternatively, for PUCCH communications of PUCCH format 1, UE 120 may use the additional values or longer sequences for the cyclic shift to enable an increase to a quantity of UEs that can be multiplexed onto a common set of resources.

In some aspects, UE 120 may process the information to cause a PUCCH communication to occupy up to 34 RBs (e.g., at a 120 kHz SCS to achieve a transmission bandwidth of 50 MHz). As described in 3GPP Technical Specification (TS) 38.211, Release 16, Version 16.4.0, § 5.2.2, the base sequence may be defined by an equation:

$$\bar{r}_{u,v}(n) = e^{j\pi\varphi(n)/4}; 0 \le n < 12M - 1; M < 3$$

$$\bar{r}_{u,v}(n) = x_q(n \bmod N_{ZC}); M \ge 3$$

$$x_q(m) = \exp\left(-\frac{j\pi qm(m+1)}{N_{ZC}}\right)$$

where $\bar{r}_{u,v}$ represents a base sequence for an index n and $N_{zc}$ represents a length of a Zadoff-Chu (ZC) sequence, which, for M=34 is 401. Here, UE 120 may determine a cyclic shift based at least in part on an equation:

$$\alpha = \frac{2\pi}{12M}\left((m_0 + m_{cs} + m_{int} + n_{cs}(n^\mu_{s,f,l} + l'))\bmod 12M\right)$$

where α represents a cyclic shift value, $m_0$ represents an initial cyclic shift, $m_{cs}$ represents an information content cyclic shift, $m_{int}$ represents an interlace cyclic shift, and $n_{cs}(n_{s,f,l}^\mu + l')$ represents a pseudo-random sequence function. In this case, UE 120 may select the value for $m_0$ from the set {0, 1, . . . , 12M−1} to enable multiplexing with other UEs. Similarly, UE 120 may select the value for $m_{cs}$ based at least in part on a fixed mapping. For example, for PUCCH format 0 with one HARQ information bit, UE may select 0 to represent a NACK or 6M to represent an ACK. Similarly, for PUCCH format 0 with two HARQ information bits, UE 120 may select a 0 to represent a NACK-NACK, 3M to represent a NACK-ACK, 6M to represent an ACK-ACK, or 9M to represent an ACK-NACK. Similarly, for PUCCH format 0 with two HARQ information bits and an SR, UE 120 may select similar cyclic shifts as for two HARQ information bits without an SR to represent the two HARQ information bits with a negative SR, and may add a value of 3M/2 to the aforementioned cyclic shifts to represent two HARQ information bits with a positive SR.

In some aspects, UE 120 may determine the value of M based at least in part on received signaling. For example, a connected UE 120 may provide information identifying a UE capability to BS 110 and BS 110 may provide information, via a DCI message, to UE 120 information identifying the value of M for PUCCH communication. Additionally, or alternatively, UE 120 may use a default, fixed value for M.

In some aspects, UE 120 may process the information such that different RB groups are associated with different cyclic shifts. For example, as shown by reference number 615-2, UE 120 may configure a cyclic shift step size and may apply a first cyclic shift $m_{rb0}$ to a first RB group of a set of M RB groups, a second cyclic shift $m_{rb1}$ to a second RB group of the set of M RB groups, or a third cyclic shift $m_{rb2}$ to a third RB group of the set of M RB groups, among other examples. In some aspects, UE 120 may use the same base sequence of length 12 for each RB group, but different cyclic shifts based at least in part on an equation:

$$\alpha = \frac{2\pi}{12M}\left((m_0 + m_{cs} + m_{int} + n_{cs}(n_{s,f,l}^\mu + l'))\bmod 12\right)$$

where a value of a cyclic shift at an i-th block is $m_{rb}=5(i-1)$ for i={1, 2, . . . , M}. In this case, UE 120 may use, for example, a cyclic shift of 5 between adjacent RBs.

Additionally, or alternatively, UE 120 may use a base sequence of length 24, but with different cyclic shifts for different RBs, based at least in part on an equation:

$$\alpha = \frac{2\pi}{24M}\left((m_0 + m_{cs} + m_{int} + n_{cs}(n_{s,f,l}^\mu + l'))\bmod 24\right)$$

where a value of a cyclic shift at an i-th block is $m_{rb}=11(i-1)$ for i={1, 2, . . . , M}. In this way, UE 120 may multiplex with up to two other UEs on a two-RB block (e.g., two HARQ communications and one SR communication), rather than a single UE communicating on a single-RB block. In some aspects, UE 120 may receive information indicating a length of a base sequence (e.g., 12 or 24, for example) that UE 120 is to use. Additionally, or alternatively, UE 120 may use a default static value, such as a defaulting to a base sequence of length 12.

In some aspects, UE 120 may apply OCC when processing the information for a PUCCH format 0 communication. For example, when UE 120 detects a threshold level of coverage, UE 120 may apply OCC to the information, which may improve multiplexing capacity relative to transmitting the information without applying OCC to the information. In this case, UE 120 may determine whether to apply the OCC based at least in part on a measurement of the coverage or a received indicator from BS 110 (e.g., via radio resource control (RRC) or DCI signaling), among other examples. To ensure backwards compatibility, in a legacy mode, UE 120 may repeat one or more OFDM symbols, rather than applying OCC, to improve multiplexing capacity.

In some aspects, UE 120 may process the information to occupy more than a threshold quantity of RBs. For example, for PUCCH format 2 communication and a 120 kHz SCS, UE 120 may use up to 34 RBs to occupy up to approximately 50 MHz transmission bandwidth and utilize a maximum allowable EIRP, as described above. In this case, UE 120 may extend frequency domain OCC to a set of M contiguous RBs. In some aspects, UE 120 may use OCC with a maximum length of up to 8 across 2 contiguous RBs. For example, UE 120 may process the information using OCC of length 1, 2, 4, or 8 across a set of 2 contiguous RBs. In this case, UE 120 may determine whether to use the OCC across a single RB or 2 contiguous RBs based at least in part on a setting of a parameter (e.g., which may be fixed or set by received signaling). In some aspects, UE 120 may determine an index of an OCC sequence to apply the OCC sequence to the information during processing for transmission. For example, UE 120 may determine the index, for an OCC sequence of length 1-4, as $(n_0+n_{idx}) \bmod N_{sf}$, where $N_{sf}$ is a spreading factor of the OCC, no is a higher layer parameter, and $n_{indx}$, is an index of a current RB among the set of M RBs. Additionally, or alternatively, UE 120 may determine the index, for an OCC sequence of length 8, as $$\left(n_0 + \left\lfloor \frac{n_{idx_1} + n_{idx_2}}{2} \right\rfloor\right) \bmod 8,$$

where $n_{index1}$ and $n_{index2}$ are indices of two contiguous RBs among the set of M RBs. The OCC that UE 120 applies may be defined in a specification, such as 3GPP TS 38.211 Table 6.3.2.5A-1 and Table 6.3.2.5A-2, which define OCC for lengths 2 and 4, respectively. Similarly, for OCC of length 8, UE 120 may use a table or other data structure identifying the OCC:

TABLE 1

| n | OCC of length-8 $w_n$ |
|---|---|
| 0 | [+1 +1 +1 +1 +1 +1 +1 +1] |
| 1 | [+1 −1 +1 −1 +1 −1 +1 −1] |
| 2 | [+1 +1 −1 −1 +1 +1 −1 −1] |
| 3 | [+1 −1 −1 +1 +1 −1 −1 +1] |
| 4 | [+1 +1 +1 +1 −1 −1 −1 −1] |
| 5 | [+1 −1 +1 −1 −1 +1 −1 +1] |
| 6 | [+1 +1 −1 −1 −1 −1 +1 +1] |

In some aspects, when processing the information, UE 120 may extend block-wise pre-DFT OCC to a set of M contiguous RBs. For example, for PUCCH format 3 communication and an SCS of 120 kHz, UE 120 may use up to 32 RBs with coding across a set of 2 contiguous RBs and a pre-DFT OCC dimension of 1, 2, 4, 6, 8, or 12, among other examples. In this case, UE 120 may construct an OCC sequence for processing the information using a DFT-matrix approach where an l-th code of length $N_s$ is represented as:

$$C_l(n) = \exp\left(-j\frac{2\pi l n}{N_s}\right) \text{ for } n = 0, 1, \ldots (N_s - 1)$$

for l={0, 1, . . . , ($N_s$–1)}, where $C_l(n)$ is the l-th code among a set of $N_s$ codes.

In some aspects, for PUCCH format 3 communication, UE 120 may determine a quantity of RBs to use based at least in part on whether interlaced mapping is enabled. For example, when non-interlaced mapping is enabled, UE 120 may use 1, 2, 3, 4, 5, 6, 8, 9, 10, 12, 15, or 16 RBs, which may reduce a complexity of transform precoding, relative to allowing other quantities of RBs, by constraining the quantity of RBs that are used. In contrast, when interlaced mapping is enabled, UE 120 may use 10 RBs for a single interlace or 20 RBs for two interlaces. In some aspects, UE 120 may process the information in connection with a set of RB units ($RB_{units}$). An $RB_{unit}$ may be defined as 16 RBs, resulting in a maximum of 2 $RB_{units}$. In this case, if a single $RB_{unit}$ is configured, UE 120 may determine to transmit the information over a first $RB_{unit}$, $RB_{unit,0}$. In contrast, if two $RB_{units}$ are configured, UE 120 may transmit the information (e.g., uplink control information (UCI) bits) across $RB_{unit,0}$ and $RB_{unit,1}$, which cover the complete 32 RBs.

As further shown in FIG. 6, and by reference number 620, UE 120 may transmit a PUCCH communication. For example, based at least in part on processing information for transmission, UE 120 may transmit the information. In this case, UE 120 may transmit a PUCCH format 0, 1, 2, or 3, among other examples, using M contiguous RBs, different cyclic shifts, or applied OCC, among other examples to ensure that an approximately 50 MHz transmission bandwidth is occupied to enable usage of a maximum available amount of transmission power, as described above.

As indicated above, FIG. 6 is provided as an example. Other examples may differ from what is described with respect to FIG. 6.

Figure 7:
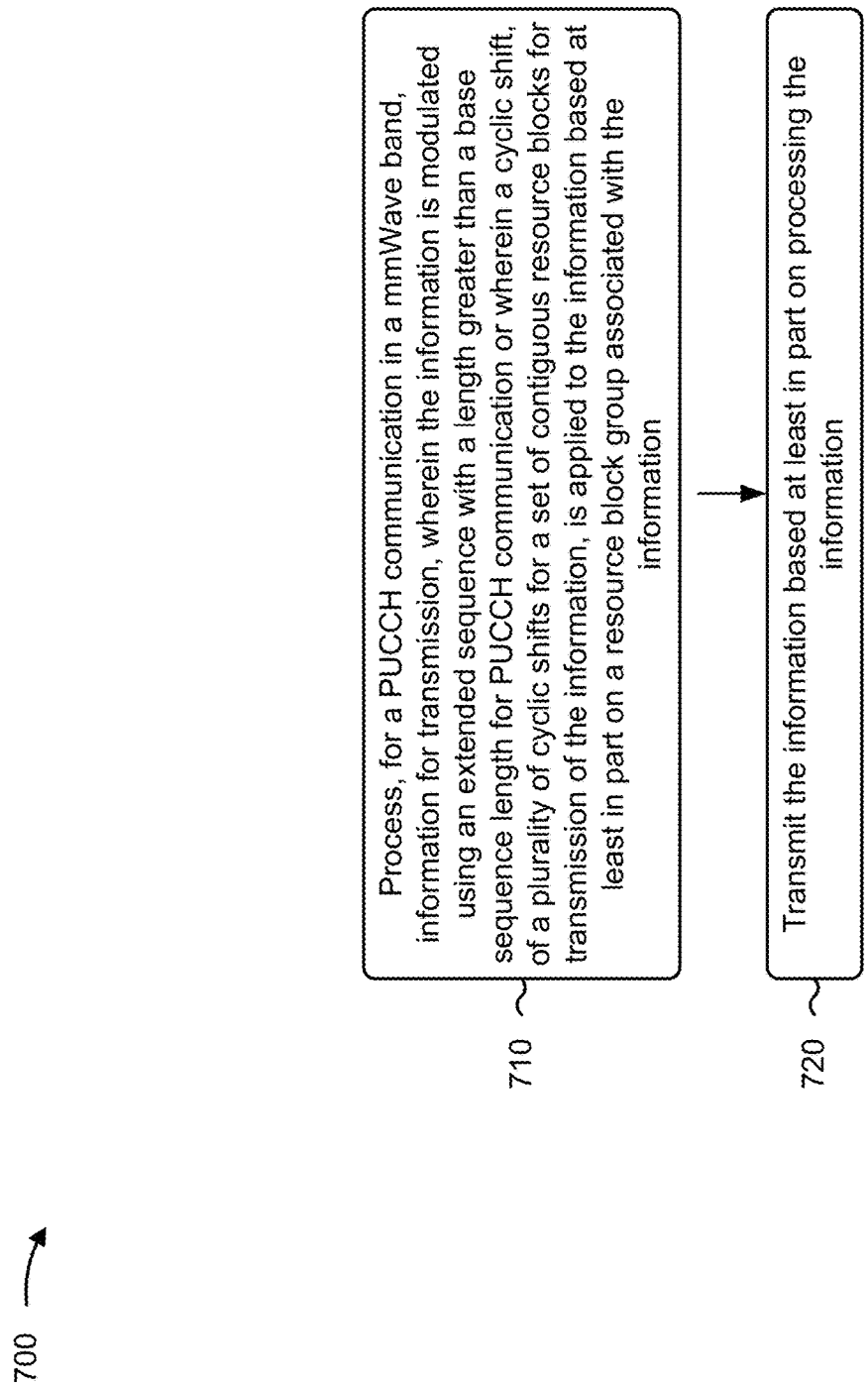
FIG. 7 is a diagram illustrating an example process associated with physical uplink control channel configuration for millimeter wave bands, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120) performs operations associated with physical uplink control channel configuration for millimeter wave bands.

As shown in FIG. 7, in some aspects, process 700 may include processing, for a PUCCH communication in a mmWave band, information for transmission, wherein the information is modulated using an extended sequence with a length greater than a base sequence length for PUCCH communication or wherein a cyclic shift, of a plurality of cyclic shifts for a set of contiguous resource blocks for transmission of the information, is applied to the information based at least in part on a resource block group associated with the information (block 710). For example, the UE (e.g., using transmission generation component 808 depicted in FIG. 8) may process, for a PUCCH communication in a mmWave band, information for transmission, wherein the information is modulated using an extended sequence with a length greater than a base sequence length for PUCCH communication or wherein a cyclic shift, of a plurality of cyclic shifts for a set of contiguous resource blocks for transmission of the information, is applied to the information based at least in part on a resource block group associated with the information, as described above.

As further shown in FIG. 7, in some aspects, process 700 may include transmitting the information based at least in part on processing the information (block 720). For example, the UE (e.g., using transmission component 804, depicted in FIG. 8) may transmit the information based at least in part on processing the information, as described above.

Process 700 may include additional aspects, such as any single aspect or any combination of aspects described below and/or in connection with one or more other processes described elsewhere herein.

In a first aspect, the PUCCH communication is associated with PUCCH format 0, PUCCH format 1, PUCCH format 2, or PUCCH format 3.

In a second aspect, alone or in combination with the first aspect, the length of the extended sequence is based at least in part on the base sequence length and a quantity of contiguous resource blocks for transmission in the mmWave band.

In a third aspect, alone or in combination with one or more of the first and second aspects, the length of the extended sequence is 12*M, where 12 is the base sequence length and M is the quantity of contiguous resource blocks for transmission in the mmWave band.

In a fourth aspect, alone or in combination with one or more of the first through third aspects, process 700 includes applying the cyclic shift to the information, wherein the cyclic shift is selected from a set of cyclic shifts that are based at least in part on the length of the extended sequence.

In a fifth aspect, alone or in combination with one or more of the first through fourth aspects, the information is associated with a transmission bandwidth of 50 megahertz and a quantity of contiguous resource blocks, and wherein the quantity of contiguous resource blocks is from 1 to 34 at a subcarrier spacing of 120 kilohertz and at the transmission bandwidth of 50 megahertz.

In a sixth aspect, alone or in combination with one or more of the first through fifth aspects, process 700 includes transmitting a first indicator identifying a UE capability of the UE, receiving a second indicator identifying a quantity of contiguous resource blocks for transmission of the information, and processing the information based at least in part on the quantity of contiguous resource blocks for transmission of the information.

In a seventh aspect, alone or in combination with one or more of the first through sixth aspects, process 700 includes identifying a stored default value for a quantity of contiguous resource blocks for transmission of the information, and processing the information based at least in part on the quantity of contiguous resource blocks for transmission of the information.

In an eighth aspect, alone or in combination with one or more of the first through seventh aspects, the cyclic shift is associated with a cyclic shift step size, and wherein the cyclic shift step size is based at least in part on a type of scheduling request associated with the transmission of the information.

In a ninth aspect, alone or in combination with one or more of the first through eighth aspects, process 700 includes modulating the information using a base sequence of length 12 or 24.

In a tenth aspect, alone or in combination with one or more of the first through ninth aspects, process 700 includes receiving an indication of a base sequence length, and processing the information based at least in part on the base sequence length.

In an eleventh aspect, alone or in combination with one or more of the first through tenth aspects, process 700 includes identifying a stored static indication of a base sequence length, and processing the information based at least in part on the base sequence length.

In a twelfth aspect, alone or in combination with one or more of the first through eleventh aspects, process 700 includes processing the information using an orthogonal cover code.

In a thirteenth aspect, alone or in combination with one or more of the first through twelfth aspects, process 700 includes receiving signaling identifying a configuration for the orthogonal cover code, and processing the information using the orthogonal cover code in accordance with the configuration for the orthogonal cover code.

In a fourteenth aspect, alone or in combination with one or more of the first through thirteenth aspects, process 700 includes transmitting a set of repetitions of one or more orthogonal frequency division multiplexing symbols generated based at least in part on the information.

In a fifteenth aspect, alone or in combination with one or more of the first through fourteenth aspects, a PUCCH format of the PUCCH communication is PUCCH format 2 with a 120 kilohertz subcarrier spacing, and wherein a maximum quantity of resource blocks for transmission of the information is 34 resource blocks.

In a sixteenth aspect, alone or in combination with one or more of the first through fifteenth aspects, a frequency domain of orthogonal cover code applied to the information comprises a particular quantity of contiguous resource blocks, wherein the particular quantity of contiguous resource blocks has a maximum length of 8 contiguous resource blocks.

In a seventeenth aspect, alone or in combination with one or more of the first through sixteenth aspects, a PUCCH format of the PUCCH communication is PUCCH format 3, and wherein a block-wise pre-Discrete Fourier Transform orthogonal cover code is a particular quantity of contiguous resource blocks.

In an eighteenth aspect, alone or in combination with one or more of the first through seventeenth aspects, a subcarrier spacing of the PUCCH communication is 120 kilohertz and a maximum for the particular quantity is 32 resource blocks, and wherein the pre-Discrete Fourier Transform orthogonal cover code has a dimension from 1 to 12.

In a nineteenth aspect, alone or in combination with one or more of the first through eighteenth aspects, the particular quantity of contiguous resource blocks is based at least in part on whether interlaced mapping is enabled.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
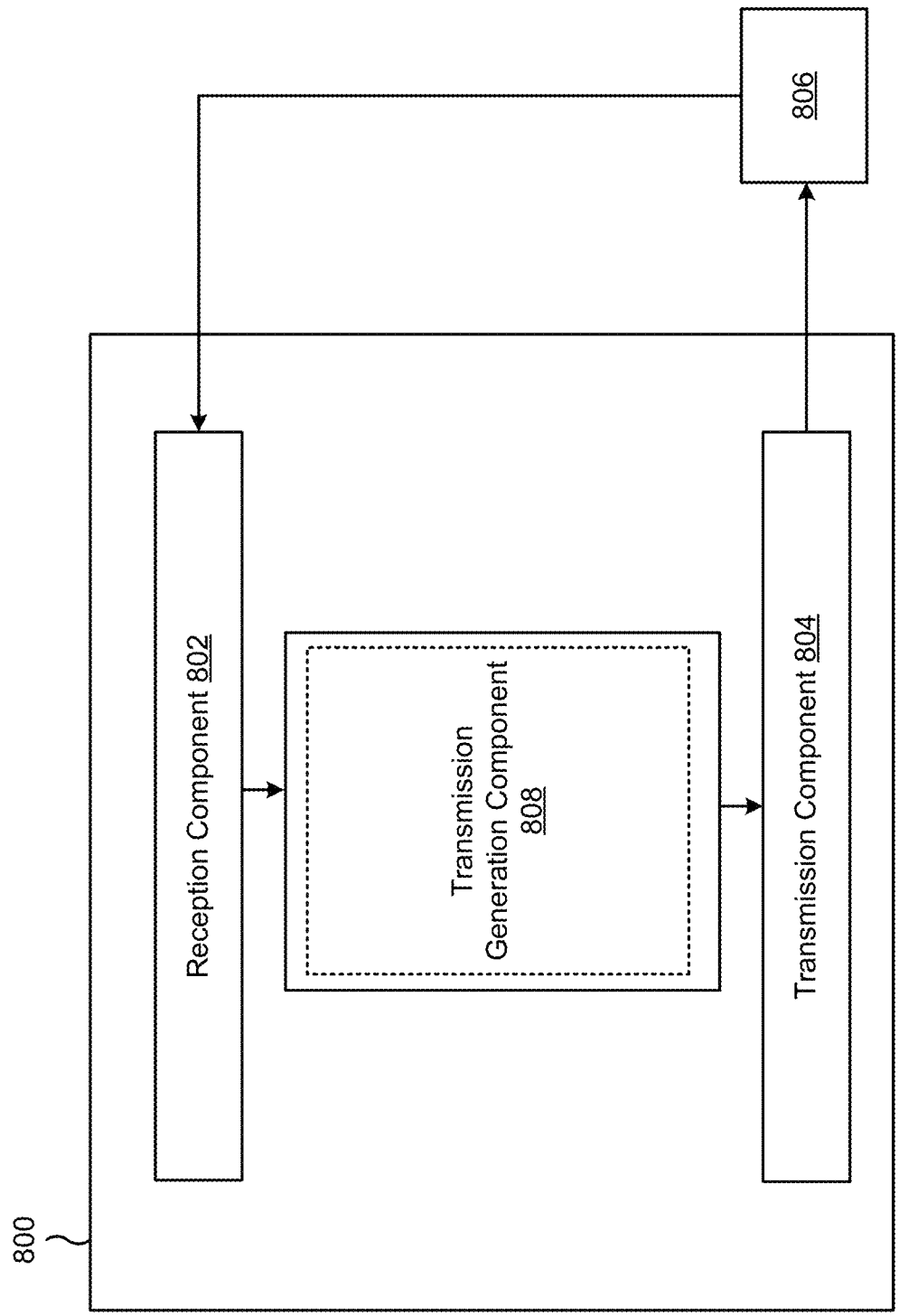
FIGS. 8 and 9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a transmission generation component 808 among other examples.

In some aspects, the apparatus 800 may be configured to perform one or more operations described herein in connection with FIGS. 6-7. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The transmission generation component 808 may process, for a PUCCH communication in a mmWave band, information for transmission, wherein the information is modulated using an extended sequence with a length greater than a base sequence length for PUCCH communication or wherein a cyclic shift, of a plurality of cyclic shifts for a set of contiguous resource blocks for transmission of the information, is applied to the information based at least in part on a resource block group associated with the information. The transmission component 804 may transmit the information based at least in part on processing the information.

The transmission generation component 808 may apply the cyclic shift to the information, wherein the cyclic shift is selected from a set of cyclic shifts that are based at least in part on the length of the extended sequence.

The transmission component 804 may transmit a first indicator identifying a UE capability of the UE.

The reception component 802 may receive a second indicator identifying a quantity of contiguous resource blocks for transmission of the information.

The transmission generation component 808 may identify a stored default value for a quantity of contiguous resource blocks for transmission of the information.

The reception component 802 may receive an indication of a base sequence length.

The transmission generation component 808 may identify a stored static indication of a base sequence length.

The reception component 802 may receive signaling identifying a configuration for the orthogonal cover code.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
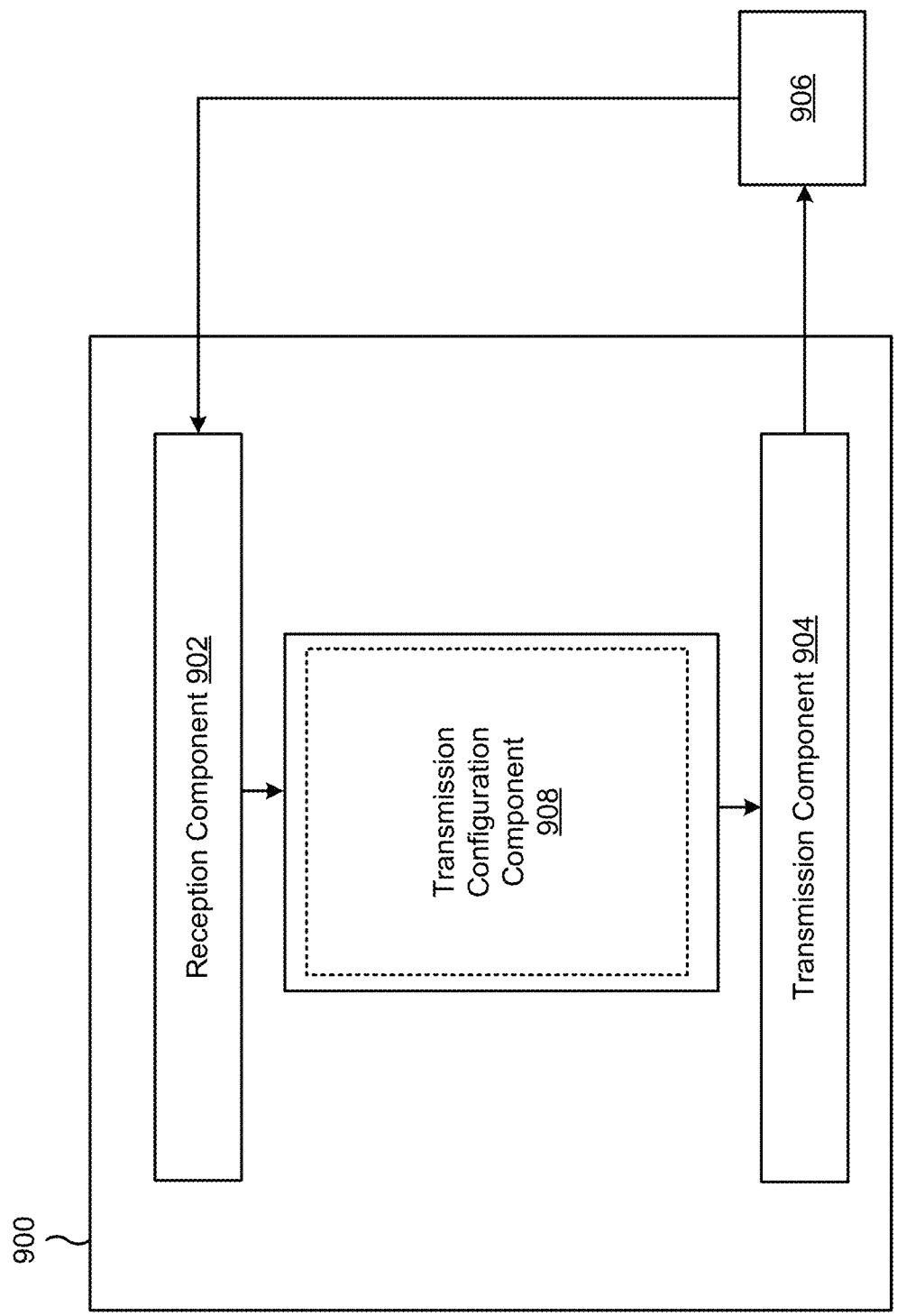

FIG. 9 is a block diagram of an example apparatus 900 for wireless communication. The apparatus 900 may be a BS, or a BS may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a transmission configuration component 908, among other examples.

In some aspects, the apparatus 900 may be configured to perform one or more operations described herein in connection with FIGS. 6-7. Additionally, or alternatively, the apparatus 900 may be configured to perform one or more processes described herein. In some aspects, the apparatus 900 and/or one or more components shown in FIG. 9 may include one or more components of the BS described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the BS described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the BS described above in connection with FIG. 2. In some aspects, the transmission component 904 may be co-located with the reception component 902 in a transceiver.

The transmission configuration component 908 may provide information, via RRC or DCI signaling, among other examples to the apparatus 906 to configure transmissions by the apparatus 906.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some aspects of the present disclosure:

Aspect 1: A method of wireless communication performed by a UE, comprising: processing, for a PUCCH communication in a mmWave band, information for transmission, wherein the information is modulated using an extended sequence with a length greater than a base sequence length for PUCCH communication or wherein a cyclic shift, of a plurality of cyclic shifts for a set of contiguous resource blocks for transmission of the information, is applied to the information based at least in part on a resource block group associated with the information; and transmitting the information based at least in part on processing the information.

Aspect 2: The method of aspect 1, wherein the PUCCH communication is associated with PUCCH format 0, PUCCH format 1, PUCCH format 2, or PUCCH format 3.

Aspect 3: The method of any of aspects 1 to 2, wherein the length of the extended sequence is based at least in part on the base sequence length and a quantity of contiguous resource blocks for transmission in the mmWave band.

Aspect 4: The method of aspect 3, wherein the length of the extended sequence is 12*M, where 12 is the base sequence length and M is the quantity of contiguous resource blocks for transmission in the mmWave band.

Aspect 5: The method of any of aspects 1 to 4, further comprising: applying the cyclic shift to the information, wherein the cyclic shift is selected from a set of cyclic shifts that are based at least in part on the length of the extended sequence.

Aspect 6: The method of any of aspects 1 to 5, wherein the information is associated with a transmission bandwidth of 50 megahertz and a quantity of contiguous resource blocks, and wherein the quantity of contiguous resource blocks is from 1 to 34 at a subcarrier spacing of 120 kilohertz and at the transmission bandwidth of 50 megahertz.

Aspect 7: The method of any of aspects 1 to 6, further comprising: transmitting a first indicator identifying a UE capability of the UE; receiving a second indicator identifying a quantity of contiguous resource blocks for transmission of the information; and wherein processing the information comprises: processing the information based at least in part on the quantity of contiguous resource blocks for transmission of the information. wherein processing the information comprises: processing the information based at least in part on the quantity of contiguous resource blocks for transmission of the information.

Aspect 8: The method of any of aspects 1 to 7, comprising: identifying a stored default value for a quantity of contiguous resource blocks for transmission of the information; and wherein processing the information comprises: processing the information based at least in part on the quantity of contiguous resource blocks for transmission of the information.

Aspect 9: The method of any of aspects 1 to 8, wherein the cyclic shift is associated with a cyclic shift step size, and wherein the cyclic shift step size is based at least in part on a type of scheduling request associated with the transmission of the information.

Aspect 10: The method of any of aspects 1 to 9, wherein processing the information comprises: modulating the information using a base sequence of length 12 or 24.

Aspect 11: The method of any of aspects 1 to 10, further comprising: receiving an indication of a base sequence length; and wherein processing the information comprises: processing the information based at least in part on the base sequence length.

Aspect 12: The method of any of aspects 1 to 11, further comprising: identifying a stored static indication of a base sequence length; and wherein processing the information comprises: processing the information based at least in part on the base sequence length.

Aspect 13: The method of any of aspects 1 to 12, wherein processing the information comprises: processing the information using an orthogonal cover code.

Aspect 14: The method of aspect 13, further comprising: receiving signaling identifying a configuration for the orthogonal cover code; and wherein processing the information using the orthogonal cover code comprises: processing the information using the orthogonal cover code in accordance with the configuration for the orthogonal cover code.

Aspect 15: The method of any of aspects 1 to 14, wherein transmitting the information comprises: transmitting a set of repetitions of one or more orthogonal frequency division multiplexing symbols generated based at least in part on the information.

Aspect 16: The method of any of aspects 1 to 15, wherein a PUCCH format of the PUCCH communication is PUCCH format 2 with a 120 kilohertz subcarrier spacing, and wherein a maximum quantity of resource blocks for transmission of the information is 34 resource blocks.

Aspect 17: The method of aspect 16, wherein a frequency domain of orthogonal cover code applied to the information comprises a particular quantity of contiguous resource blocks, wherein the particular quantity of contiguous resource blocks has a maximum length of 8 contiguous resource blocks.

Aspect 18: The method of any of aspects 1 to 17, wherein a PUCCH format of the PUCCH communication is PUCCH format 3, and wherein a block-wise pre-Discrete Fourier Transform orthogonal cover code is a particular quantity of contiguous resource blocks.

Aspect 19: The method of aspect 18, wherein a subcarrier spacing of the PUCCH communication is 120 kilohertz and a maximum for the particular quantity is 32 resource blocks, and wherein the pre-Discrete Fourier Transform orthogonal cover code has a dimension from 1 to 12.

Aspect 20: The method of aspect 18, wherein the particular quantity of contiguous resource blocks is based at least in part on whether interlaced mapping is enabled.

Aspect 21: An apparatus for wireless communication at a device, comprising a processor; memory coupled with the processor; and instructions stored in the memory and executable by the processor to cause the apparatus to perform the method of one or more aspects of aspects 1-20.

Aspect 22: A device for wireless communication, comprising a memory and one or more processors coupled to the memory, the memory and the one or more processors configured to perform the method of one or more aspects of aspects 1-20.

Aspect 23: An apparatus for wireless communication, comprising at least one means for performing the method of one or more aspects of aspects 1-20.

Aspect 24: A non-transitory computer-readable medium storing code for wireless communication, the code comprising instructions executable by a processor to perform the method of one or more aspects of aspects 1-20.

Aspect 25: A non-transitory computer-readable medium storing a set of instructions for wireless communication, the set of instructions comprising one or more instructions that, when executed by one or more processors of a device, cause the device to perform the method of one or more aspects of aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
  one or more memories; and
  one or more processors coupled to the one or more memories, the one or more processors configured to:
    process, for a physical uplink control channel (PUCCH) communication in a millimeter wave (mmWave) band, information for transmission,
      wherein the information is modulated using an extended sequence with a length greater than a base sequence length for PUCCH communication, the extended sequence being based at least in part on the base sequence length and a quantity of contiguous resource blocks for transmission in the mmWave band, or
      wherein a cyclic shift, of a plurality of cyclic shifts for a set of contiguous resource blocks for transmission of the information, is applied to the information based at least in part on a resource block group associated with the information; and
    transmit the information based at least in part on processing the information.

2. The UE of claim 1, wherein the PUCCH communication is associated with PUCCH format 0, PUCCH format 1, PUCCH format 2, or PUCCH format 3.

3. The UE of claim 1, wherein the length of the extended sequence is 12*M, where 12 is the base sequence length and M is the quantity of contiguous resource blocks for transmission in the mmWave band.

4. The UE of claim 1, wherein the one or more processors are further configured to:
  apply the cyclic shift to the information, wherein the cyclic shift is selected from a set of cyclic shifts that are based at least in part on the length of the extended sequence.

5. The UE of claim 1, wherein the information is associated with a transmission bandwidth of 50 megahertz and the quantity of contiguous resource blocks, and wherein the quantity of contiguous resource blocks is from 1 to 34 at a subcarrier spacing of 120 kilohertz and at the transmission bandwidth of 50 megahertz.

6. The UE of claim 1, wherein the one or more processors are further configured to:
  transmit a first indicator identifying a UE capability of the UE;
  receive a second indicator identifying the quantity of contiguous resource blocks for transmission of the information; and
  wherein the one or more processors, when processing the information, are to:
    process the information based at least in part on the quantity of contiguous resource blocks for transmission of the information.

7. The UE of claim 1, wherein the one or more processors are to:
  identify a stored default value for the quantity of contiguous resource blocks for transmission of the information; and
  wherein the one or more processors, when processing the information, are to:
    process the information based at least in part on the quantity of contiguous resource blocks for transmission of the information.

8. The UE of claim 1, wherein the cyclic shift is associated with a cyclic shift step size, and wherein the cyclic shift step size is based at least in part on a type of scheduling request associated with the transmission of the information.

9. The UE of claim 1, wherein the one or more processors, when processing the information, are to:
  modulate the information using a base sequence of length 12 or 24.

10. The UE of claim 1, wherein the one or more processors are further to:
  receive an indication of the base sequence length; and
  wherein the one or more processors, when processing the information, are to:
    process the information based at least in part on the base sequence length.

11. The UE of claim 1, wherein the one or more processors are further to:
identify a stored static indication of the base sequence length; and
wherein the one or more processors, when processing the information, are to:
process the information based at least in part on the base sequence length.

12. The UE of claim 1, wherein the one or more processors, when processing the information, are to:
process the information using an orthogonal cover code.

13. The UE of claim 12, wherein the one or more processors are further configured to:
receive signaling identifying a configuration for the orthogonal cover code; and
wherein the one or more processors, when processing the information using the orthogonal cover code, are to:
process the information using the orthogonal cover code in accordance with the configuration for the orthogonal cover code.

14. The UE of claim 1, wherein the one or more processors, when transmitting the information, are to:
transmit a set of repetitions of one or more orthogonal frequency division multiplexing symbols generated based at least in part on the information.

15. The UE of claim 1, wherein a PUCCH format of the PUCCH communication is PUCCH format 2 with a 120 kilohertz subcarrier spacing, and wherein a maximum quantity of resource blocks for transmission of the information is 34 resource blocks.

16. The UE of claim 15, wherein a frequency domain orthogonal cover code applied to the information comprises a particular quantity of contiguous resource blocks, wherein the particular quantity of contiguous resource blocks has a maximum length of 8 contiguous resource blocks.

17. The UE of claim 1, wherein a PUCCH format of the PUCCH communication is PUCCH format 3, and wherein a block-wise pre-Discrete Fourier Transform orthogonal cover code is a particular quantity of contiguous resource blocks.

18. The UE of claim 17, wherein a subcarrier spacing of the PUCCH communication is 120 kilohertz and a maximum for the particular quantity is 32 resource blocks, and wherein the pre-Discrete Fourier Transform orthogonal cover code has a dimension from 1 to 12.

19. The UE of claim 17, wherein the particular quantity of contiguous resource blocks is based at least in part on whether interlaced mapping is enabled.

20. A method of wireless communication performed by a user equipment (UE), comprising:
processing, for a physical uplink control channel (PUCCH) communication in a millimeter wave (mmWave) band, information for transmission,
wherein the information is modulated using an extended sequence with a length greater than a base sequence length for PUCCH communication, the extended sequence being based at least in part on the base sequence length and a quantity of contiguous resource blocks for transmission in the mmWave band, or
wherein a cyclic shift, of a plurality of cyclic shifts for a set of contiguous resource blocks for transmission of the information, is applied to the information based at least in part on a resource block group associated with the information; and
transmitting the information based at least in part on processing the information.

21. The method of claim 20, wherein the PUCCH communication is associated with PUCCH format 0, PUCCH format 1, PUCCH format 2, or PUCCH format 3.

22. The method of claim 20, wherein the length of the extended sequence is 12*M, where 12 is the base sequence length and M is the quantity of contiguous resource blocks for transmission in the mmWave band.

23. The method of claim 20, further comprising:
applying the cyclic shift to the information, wherein the cyclic shift is selected from a set of cyclic shifts that are based at least in part on the length of the extended sequence.

24. The method of claim 20, wherein the information is associated with a transmission bandwidth of 50 megahertz and the quantity of contiguous resource blocks, and wherein the quantity of contiguous resource blocks is from 1 to 34 at a subcarrier spacing of 120 kilohertz and at the transmission bandwidth of 50 megahertz.

25. The method of claim 20, further comprising:
transmitting a first indicator identifying a UE capability of the UE;
receiving a second indicator identifying the quantity of contiguous resource blocks for transmission of the information; and
wherein processing the information comprises:
processing the information based at least in part on the quantity of contiguous resource blocks for transmission of the information.

26. The method of claim 20, comprising:
identifying a stored default value for a quantity of contiguous resource blocks for transmission of the information; and
wherein processing the information comprises:
processing the information based at least in part on the quantity of contiguous resource blocks for transmission of the information.

27. A non-transitory computer-readable medium storing a set of instructions for wireless communication, the set of instructions comprising:
one or more instructions that, when executed by one or more processors of a user equipment (UE), cause the UE to:
process, for a physical uplink control channel (PUCCH) communication in a millimeter wave (mmWave) band, information for transmission,
wherein the information is modulated using an extended sequence with a length greater than a base sequence length for PUCCH communication, the extended sequence being based at least in part on the base sequence length and a quantity of contiguous resource blocks for transmission in the mmWave band, or
wherein a cyclic shift, of a plurality of cyclic shifts for a set of contiguous resource blocks for transmission of the information, is applied to the information based at least in part on a resource block group associated with the information; and
transmit the information based at least in part on processing the information.

28. An apparatus for wireless communication, comprising:
means for processing, for a physical uplink control channel (PUCCH) communication in a millimeter wave (mm Wave) band, information for transmission,
wherein the information is modulated using an extended sequence with a length greater than a base sequence length for PUCCH communication, the extended sequence being based at least in part on the base sequence length and a quantity of contiguous resource blocks for transmission in the mmWave band, or wherein a cyclic shift, of a plurality of cyclic shifts for a set of contiguous resource blocks for transmission of the information, is applied to the information based at least in part on a resource block group associated with the information; and means for transmitting the information based at least in part on processing the information.

29. The apparatus of claim 28, wherein the quantity of contiguous resource blocks is from 1 to 34 at a subcarrier spacing of 120 kilohertz and at a transmission bandwidth of 50 megahertz.

30. The apparatus of claim 28, wherein a maximum quantity of resource blocks for transmission of the information is 34 resource blocks.

* * * * *